United States Patent [19]

Soemers et al.

[11] Patent Number: 4,785,219
[45] Date of Patent: Nov. 15, 1988

[54] CATHODE RAY TUBE WITH IMPROVED DEFLECTION UNIT MOUNTING

[75] Inventors: Hermanus M. J. R. Soemers; Johan F. J. M. Caers; Joseph A. Meertens, all of Eindhoven, Netherlands

[73] Assignee: U.S. Philips Corporation, New York, N.Y.

[21] Appl. No.: 86,436

[22] Filed: Aug. 17, 1987

[30] Foreign Application Priority Data

Aug. 18, 1986 [GB] United Kingdom ............... 8620057

[51] Int. Cl.⁴ .............................................. H01J 23/16
[52] U.S. Cl. ........................................ 315/3; 335/210; 335/212
[58] Field of Search ............................ 315/1.0, 370, 3; 358/10; 313/421, 413; 335/212, 210

[56] References Cited

U.S. PATENT DOCUMENTS

| | | | |
|---|---|---|---|
| 3,939,447 | 2/1976 | D'Amato | 358/248 |
| 3,986,156 | 10/1976 | Smith | 358/248 |
| 4,195,315 | 3/1980 | Pytlarz | 358/248 |

Primary Examiner—David K. Moore
Attorney, Agent, or Firm—John C. Fox

[57] ABSTRACT

A cathode ray tube display device which has an arrangement for mounting a deflection unit on the conical portion of a cathode ray tube envelope. In order to permit a rapid mounting of the deflection unit in a manner which provides shock resistance, and resistance temperature fluctuations in the deflection unit and the envelope, three V-shaped, sheet metal connecting devices connect the deflection unit to the conical portion of the envelope. The free ends of the devices are attached to the deflection unit in such a manner that the vertices of the devices are substantially tangential to the surface of the conical portion. After adjustment of the deflection unit the vertices of the devices are secured to the conical portion in such a manner that the connections are loaded with a shearing force.

10 Claims, 4 Drawing Sheets

CATHODE RAY TUBE WITH IMPROVED DEFLECTION UNIT MOUNTING

BACKGROUND OF THE INVENTION

The present invention relates to a display device, particularly to the cantilevered mounting of a deflection unit on the external surface of a cathode ray tube envelope.

When mounting a deflection unit sometimes referred to as a yoke, it is known to provide a moulded plastic former into which saddle coils are positioned. Additional saddle coils are disposed on the external surface of the former. A ferrite cone is placed about the outer coils. The deflection unit is then placed on a master tube and a test picture is displayed on the display tube screen. The positions of the ferrite cone and the outer windings are adjusted so that the test picture is correct and a quick setting epoxy resin is used to bond the relevant parts together.

Other proposals for mounting deflection units are disclosed in U.S. Pat. Nos. 3,986,156 and 3,939,447 and German Auslegeschrift No. 26 55 960. In the case of U.S. Pat. No. 3,986,156 an annular platform is bonded onto the external surface of the tube cone. A housing is mounted on the deflection unit. At positions disposed at 90° of rotation about the Z-axis of the display tube, rigid members are disposed between and connect the deflection unit to the platform. Once the position of the deflection unit has been adjusted the rigid members are either bonded or ultrasonically welded in position. Such a mounting arrangement has three strong degrees of freedom and three weak degrees of freedom.

U.S. Pat. No. 3,939,447 discloses three embodiments of a yoke mounting means. In the simplest of these three embodiments the deflection unit is mounted in an annular housing which four cantilever springs extending threfrom. This assembly is placed on the neck of the display tube so that the free ends of the springs are in direct contact with the conical portion of the tube envelope. Each spring has a hollow post thereon which serves as a conduit for adhesive. After the deflection unit has been adjusted then the springs are bonded to the conical portion by adhesive introduced through the hollow posts. Optionally auxiliary coil springs may be attached between the posts and the display tube mounting means to minimize any shearing force between the cantilevered springs and the conical portion of the envelope caused by the pressure of the cantilevered springs which, due to the adjustment of the deflection unit, are under varying degrees of distortion. The use of adhesives to secure the springs to the envelope has a number of disadvantages with respect to the speed of fixing and the reliability of the respective joints.

Auslegeschrift No. 26 55 960 discloses a defection unit mounting system comprising a supporting ring bonded onto the conical surface of the display tube envelope. Flexible arms extend from the deflection unit and engage the supporting ring with a knife edge contact. The position of the deflection unit is adjusted to its desired position by flexing the arms and once the optimum position has been reached the knife edge contacts of the arms are ultrasonically welded to the supporting ring and a potting compound is introduced into the space between the tube neck and the end of the deflection unit.

These methods of deflection unit mounting do not lend themselves to being easily mechanised. For mechanisation of the deflection unit mounting it is necessary to be able to mount the deflection unit on the tube neck, adjust the unit to its optimum position to give a proper image and to fix the unit in this optimum position very rapidly. The mounting arrangement should be such as to provide shock resistance, thermal stability over the expected working life of the tube and only 6 degrees of freedom.

SUMMARY OF THE INVENTION

According to one aspect of the present invention there is provided a display device comprising a cathode ray tube having an envelope formed by an optically transparent faceplate, a neck and a conical portion interconnecting the faceplate and the neck, a deflection unit disposed about the neck-conical portion transition of the envelope, and elongate connecting members connecting the deflection unit to at least three points of attachement on the conical portion, the connecting members being inclined with respect to a longitudinal axis of the cathode ray tube, the inclination of each of the connecting members being such that each connecting member is substantially tangential to the conical portion at its point of attachment therewith so that substantially shear stress is applied to the point of attachment.

By the point of contact between each connecting member and the envelope being such that substantially shear stress is applied, the connections are resistant to peeling as is more likely to be the case if the connecting member were at an angle of substantially 90° to the surface of the envelope. The mounting of the deflection unit is shock resistant, typically the connections can resist up to 50 G, where G is the acceleration due to gravity.

In one embodiment of the present invention there are six connecting members, pairs of the members being secured to the deflection unit such that they diverge relative to each other, adjacent connecting members from different pairs being attached substantially contiguously to the conical portion.

In another embodiment of the present invention pairs of connecting members comprise respective limbs of V-shaped devices which are attached by their vertices to conical portion. Adjacent connecting members from different pairs are attached substantially contiguously to the deflection unit.

The use of such types of connecting members enables the deflection unit to be mounted in six degrees of freedom, that is in the X, Y and Z axial directions and rotation about these three axes.

In order to provide thermal stability it is desirable to match the coefficients of expansion of the materials used in fabricating the envelope and making the connecting members. For example the connecting members may comprise a metal, a synthetic material or glass or a combination of say metal and synthetic materials in order to obtain the desired coefficient of expansion.

In the case of at least the terminal portions of the connecting members attached to the conical portion being metallic, then, after adjustment of the deflection unit, the connection of the terminal portions to the conical portion may be by way of laser welds. To facilitate such a connection to a glass conical portion, metallic mounting pads, for example discs, are thermally compression bonded to the conical portion at predetermined positions thereon and the terminal portions are attached by laser welds to the mounting pads. By means of being able to laser weld the connecting members to the metallic mounting pads, a permanent connection having the necessary degree of shock resistance can be effected very rapidly.

In the case of at least the terminal portions of the connecting members attached to the conical portion being of a synthetic material, then the connections to the conical portion may be by way of ultrasonic welds to plastic mounting pads, for example discs, bonded at predetermined positions on the conical portion.

The cross-sectional shape of the connecting members may be such as to make them resistant to buckling. An advantage of optimising the cross-sectional shape in this way is that the members themselves can be fabricated in the case of metal from thin sheet material rather than rod-like material of relatively thick section. Fabricating the connecting members from thin sheet material provides the additional advantage of their having a small thermal time constant so that they are capable of following temperature fluctuations of the cathode ray tube and the deflection unit.

According to another aspect of the present invention there is provided a method of mounting a deflection unit on a cathode ray tube envelope, comprising disposing a deflection unit on the envelope, the deflection unit having at least six connecting members, pairs of the connecting members having corresponding ends connected at spaced apart positions to the deflection unit, each connection point being contiguous with a connection point of an end of an adjacent member of another pair, the members of each pair being mutually convergent so that their terminal portions are contiguous; displaying a test pattern on the cathode ray tube; adjusting the deflection unit such that an optimum pattern is obtained and that the terminal portions of the connecting members are contacting substantially tangentially the surface of a conical portion of the envelope and effecting a rapid, permanent connection of the terminal portions to the envelope.

BRIEF DESCRIPTION OF THE DRAWINGS

The present invention will now be described, by way of example, with reference to the accompanying drawings, characterised in that.

DESCRIPTION OF THE PREFERRED EMBODIMENTS

Figure 1:
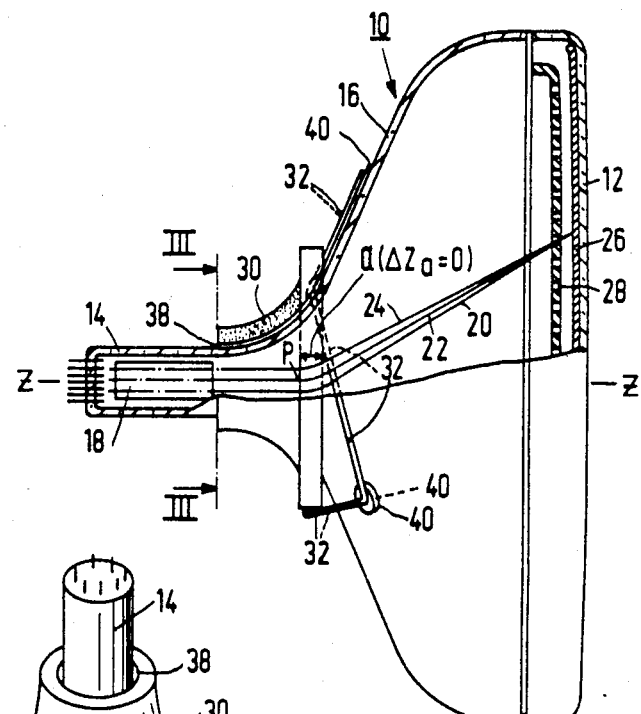
FIG. 1 is a diagrammatic partial cross-sectional view through an in-line gun colour cathode ray tube, deflection yoke and yoke mounting system.
Figure 2:
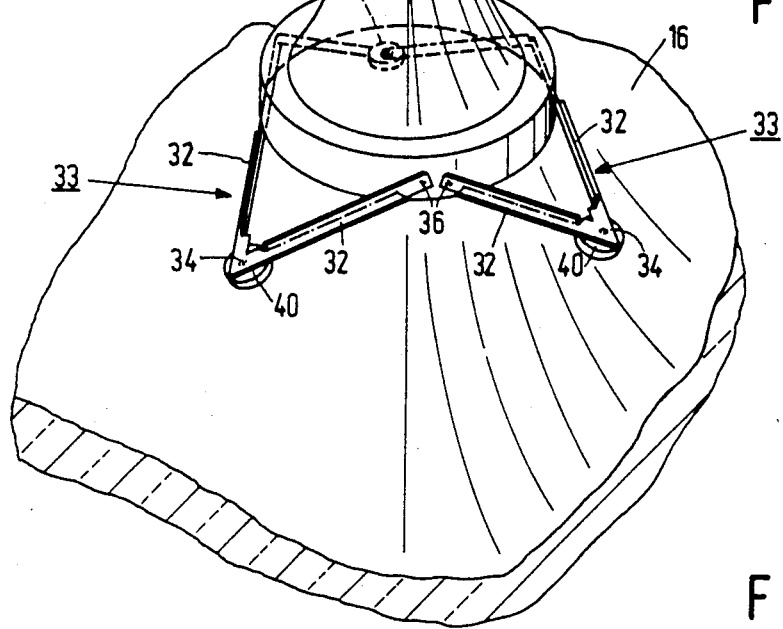
FIG. 2 is a perspective view of a part of a cathode ray tube illustrating the deflection yoke and mounting system.
Figure 3:
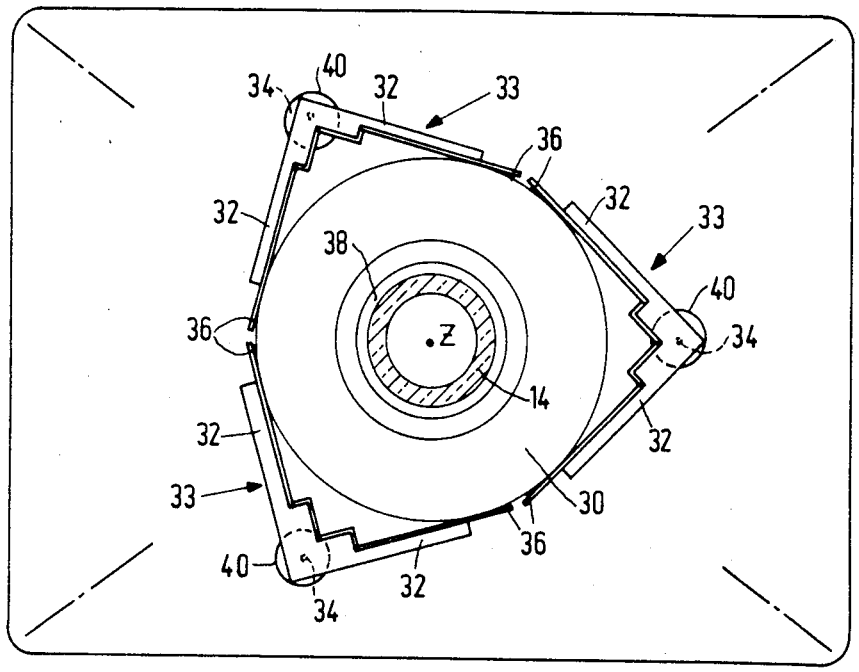
FIG. 3 is a section on the line III—III in FIG. 1.

In the drawings, the same reference numerals have been used to indicate corresponding features.

The cathode ray tube shown in FIG. 1 comprises an envelope 10 formed by an optically transparent, substantially rectangular faceplate 12, a neck 14 of circular cross-section and a conical portion (or cone) 16 interconnecting the faceplate 12 and the neck 14. The cross-section of the cone 16 changes from circular at the neck end to rectangular at the faceplate end.

Within the envelope 10 is provided an electron gun assembly 18 for producing 3 in-line arranged electron beams 20, 22 and 24. A cathodoluminescent screen 26 is provided on the inside of the faceplate 12. The screen 26 comprises repeating groups of phosphor stripes which extend normal to the plane of the drawing. An apertured shadow mask 28 is positioned within the envelope 10 at a short distance from the screen 26.

The electron beams 20, 22 and 24 are scanned across the screen 26 and the shadow mask 28 in response to signals supplied to a deflection unit 30. As is known the precise construction of the deflection unit 30 will depend on the size and function of the cathode ray tube. However as a generality the unit 30 comprises two sets of coils, say saddle-wound coils, for deflection in the X- and Y-planes. One set of coils is disposed inside a moulded plastic former and the other of the two sets is disposed on the outside of the former. A ferrite cone is disposed over the outer set of coils. When mounting the deflection unit 30 on the neck/cone portion of the envelope 10 it is necessary for the whole deflection unit 30 to be adjusted so that a test pattern displayed on the screen 26 by the electron beams 20, 22, 24 is optimised. Once this adjustment has been completed it is desirable for the deflection unit 30 to be permanently secured so that ideally the deflection point P of the electron beams remains substantially fixed. In consequence alignment of the beams at the screen 26 ids maintained in spite of temperature changes and mechanical shocks.

FIGS. 1 to 5 illustrate one embodiment of a deflection unit 30 mounting means which enables mounting in six degrees of freedom. These mounting means comprise three pairs of connecting members 32. Corresponding terminal portions of the members are joined so that a V-shaped connecting device 33 is formed as is shown more clearly in FIG. 4. The vertices 34 of the devices 33 are attached to the conical portion 16 at points disposed equi-angularly about the longitudinal- (or Z-) axis of the cathode ray tube. The free ends 36 of the devices 33 are attached at spaced apart positions to the deflection unit 30. The internal dimensions of the deflection unit 30 are such that a space 38 exists between the neck 14 and the unit 30 to enable the unit 30 to be rotated and/or displaced so that the optimum position is achieved and then the connecting devices 33 are permanently secured by their vertices 34 to the conical portion 16, which may be of glass or metal.

The points of attachment of the vertices 34 to the conical portion 16 have to be determined after taking into account a number of factors including trying to ensure that the deflection point of the deflection unit 30 coincides with the deflection point required by the cathode ray tube, independent of temperature fluctuations. The method of mounting the deflection unit 30 should be shock resistant up to 50 G. The thermal time constant of the connecting members 32 should be small so that the members can follow the effects of temperature fluctuations of the deflection unit and the cathode ray tube.

With the foregoing considerations in mind the means of cantilevered mounting the deflection unit ensures that the connection between the conical portion 16 and the deflection unit 30 is loaded in a favourable manner, that is on a shearing force. This means that in attaching the connecting members 32 to the conical portion 16, the line along which the force vector F (FIG. 5) acts is tangent or substantially tangent to the surface of the conical portion 16 at the point of attachment of the members to the envelope.

In the case of the conical portion 16 being fabricated from glass then a suitable connection can be made by thermal compression bonding flat metallic discs 40 at predetermined positions to the glass surface. The discs are typically 12 mm in diameter. The deflection unit 30 with the attached connecting devices 33 is arranged on the neck/conical portion so that during adjustment the vertices are in contact with the discs 40. At the completion of the adjustment of the deflection unit 30, the vertices 34 are laser welded to their associated disc 40. The discs 40 are fabricated from a material which has substantially the same coefficient of expansion as the glass to which they are thermally compression bonded, a suitable material being an alloy of indium, cobalt and nickel.

The positions of the discs 40 are chosen having regard to the effects of temperature fluctuations on the material of the conical portion, the expansion/contraction of the coils of the deflection unit and the expansion/contraction of the connecting members 32. Ideally the overall shift in the point of the deflection P should lie in the range $\pm 30$ $\mu$m and preferably be zero.

In order to calculate the positions of the discs relative to the position P, the effects of temperature fluctuations will be considered.

Referring to FIGS. 3 and 7 to 10, it will be realised that the discs 40 are disposed 120° degrees apart about the Z-axis. Each of the V-shaped connecting devices 33 lies in a plane 50 (FIG. 7) which intersects the Z-axis at an angle $\beta$ which is equal to about 60°. If now another plane 52 normal to the plane 50 is constructed so that it contains the free ends 36 of a V-shape connecting device 33, then each member 32 of the device 33 forms an angle $\gamma$ with the intersection line of the planes 50 and 52. Typically $\gamma = 25°$.

In considering the thermal effects, it is convenient to consider the members 32 of the connecting devices 33 as constituting a toggle mechanism in which a change in the length 2b (FIG. 8) of the substrate and/or the limbs has considerable consequences for the displacement $\Delta u$ which may be regarded as the displacement of the point of connection to the conical portion 16. For example if the substrate only expands so that the dimension 2b increases then $\Delta u$ is moved towards the substrate as a result of the ends of the limbs being moved outwards. Conversely if the limbs only expand, the distance 2b remaining unchanged, then $\Delta u$ moves in a direction away from the substrate. The movement or non-movement of $\Delta u$ resulting from the effects of heat fluctuations on the deflection unit 30, the envelope 10 and the connecting members 32 will now be considered.

1. Expansion of the substrate only, the limbs of the connecting members being unchanged:

$$\frac{\Delta u_1}{\Delta b} = -\frac{1}{\tan\gamma} \qquad (1)$$

2. Expansion of the limbs only at constant dimensions of the substrate $$\frac{\Delta u_2}{\Delta l} = \frac{1}{\sin\gamma} \qquad (2)$$

Combining Equations (1) and (2)

$$\Delta u = \Delta u_1 + \Delta u_2 = \frac{l_o \cdot \alpha_m \cdot \Delta T}{\sin\gamma} - \frac{b_o \cdot \alpha_{gl} \cdot \Delta T}{\tan\gamma} \qquad (3)$$

where
$l_o$ is the original length of a limb
$\alpha_m$ is the coefficient of expansion of the material of the connecting member
$\Delta T$ is the change in temperature,
$b_o$ is the original half distance between the points of attachment of the free ends of the limbs,
$\alpha_{gl}$ is the coefficient of expansion of expansion of the substrate material, for example glass.

A deflection unit maintaining its dimensions has a displacement in the Z-direction of $\Delta u/\cos\beta$.

The deflection unit itself has a radial expansion $\Delta r_{DU}$. If the deflection yoke expands radially to a greater extent than the limbs, that is if $\Delta u \sin\beta \leq \Delta r_{DU}$, then as shown in FIG. 9, a part $\Delta Z_1$ of the total displacement along the axis is calculated as follows:

$$\Delta Z_1 = \Delta u \cdot \cos\beta$$

Figures 9, 10:
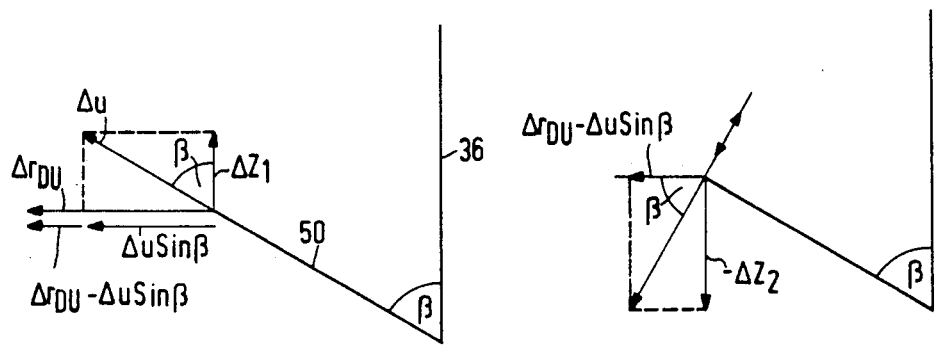

Ignoring the radial expansion of the substrate with respect to that of the deflection unit, that is as shown in FIG. 10, then the displacement along the axis $\Delta Z_2$ in the opposite direction to $\Delta Z_1$ is calculated as follows:

$$\Delta Z_2 = -(\Delta r_{DU} - \Delta u \sin\beta) \cdot \tan\beta.$$

Consequently the net displacement in the Z direction of the deflection unit at the area of the support is $\Delta Z = \Delta Z_1 + \Delta Z_2 = \Delta u \cos\beta - (\Delta r_{DU} - \Delta u \sin\beta) \cdot \tan\beta$.

A material point of the deflection unit having a distance a (in the Z direction) with respect to the fixation point will undergo a displacement $\Delta Z_a$ in the Z-direction, where:

$$\Delta Z_a = \Delta u \cos\beta - (\Delta r_{DU} - \Delta u \sin\beta) \cdot \tan\beta + \Delta a \qquad (4)$$

with $\Delta a = a \cdot \alpha_{DU} \cdot \Delta T$ where $\alpha_{DU}$ is the coefficient of expansion of the deflection unit. Equation (4) can be rewritten as follows $$\Delta Z_a = \Delta u (\cos\beta + \sin\beta \cdot \tan\beta) - \Delta r_{DU} \cdot \tan\beta + \Delta a = \Delta u/\cos\beta - \Delta r_{DU} \cdot \tan\beta + \Delta a \qquad (5)$$

Dividing equation (5) by $\Delta T$ and substituting equation (3) for $\Delta u$:

$$\frac{\Delta Z_a}{\Delta T} = \left( \frac{l_o \cdot \alpha_m}{\sin\gamma} - \frac{b_o \cdot \alpha_{gl}}{\tan\gamma} \right) \cdot \frac{1}{\cos\beta} - r_{DU} \cdot \tan\beta + a\alpha_{DU}$$

In order to determine a thermally stable point a on the Z-axis, which point is not displaced in the Z direction with respect to the points on the envelope 10 to which the connecting members are securd then the equation is solved for $\Delta Z_a = 0$, that is $$a_{(\Delta Z_a = 0)} = \qquad (6)$$

-continued $$\frac{1}{\alpha_{DU}}\left\{\left(\frac{-l_o \cdot \alpha_m}{\sin\gamma} + \frac{b_o \cdot \alpha_{g1}}{\tan\gamma}\right) \cdot \frac{1}{\cos\beta} + r_{DU} \cdot \alpha_{DU} \cdot \tan\beta\right\}$$

By way of illustration, a numerical example will now be given.

In the following example the connecting members comprise $\frac{7}{8}$ of their length of stainless steel ($\alpha = 18.10^{-6}$) and $\frac{1}{8}$ of their length of noryl ($\alpha = 60.10^{-6}$). The expansion coefficient $\alpha_m$ of each connecting member is calculated as follows:

$$\alpha_m = \tfrac{7}{8} \times 18.10^{-6} + \tfrac{1}{8} \times 60 \times 10^{-6} = 23.10^{-6}$$

Other values are $\alpha_{DU} = 60.10^{-6}$ (noryl); $\alpha_{g1} = 9.10^{-6}$ (glass); $\beta = 60°$; $\alpha = 25°$; $b_o = 72$ mm; $l_o = 80$ mm and $r_{DU} = 75$ mm Substituting these values into Equation (6):

$$\alpha_{(\Delta Z_a = 0)} = \frac{1}{60}\left\{2\left(\frac{72 \cdot 9}{\tan 25°} - \frac{80 \cdot 23}{\sin 25°}\right) + 75 \cdot 60 \cdot \tan 60°\right\}$$

$$= \frac{1}{60}(-5928 + 7795)$$

$$= 31 \text{ mm}$$

Referring to FIG. 1, $\alpha_{(\Delta Z_a = 0)}$ is the distance from the leading face of the deflection unit 30 to the deflection point P. In the event of the thermally stable point and the point of deflection P not coinciding then varying the composition of the connecting members and thereby the value of $\alpha_m$ will contribute to achieving this objective.

Figure 4:
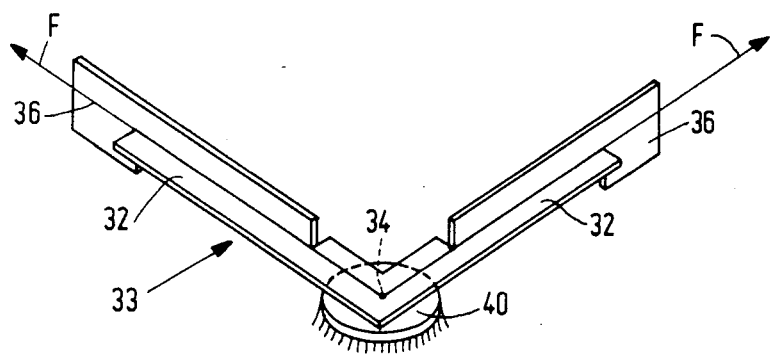
FIG. 4 is a perspective view of an embodiment of a V-shaped connecting member.
Figure 5:
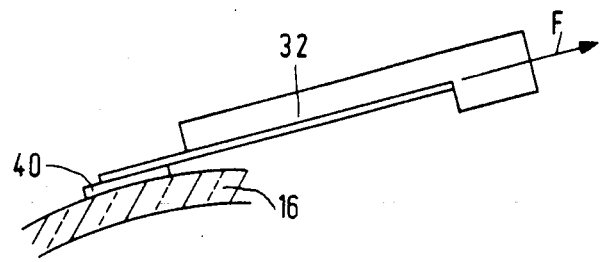
FIG. 5 is a diagrammatic view showing the connection of the connecting member to a glass envelope.

In the illustrated embodiment, the connecting devices 33 are made from a thin stainless steel sheet material and have the shape shown in FIG. 4, that is each member 32 of the device has a central portion of right angular cross section, one terminal portion comprising a vertical planar portion and the other terminal portion being a horizontal planar portion which is connected to the metal disc 40. The horizontal terminal portions of the members 32 are integrated to form the vertex 34.

Figure 6:
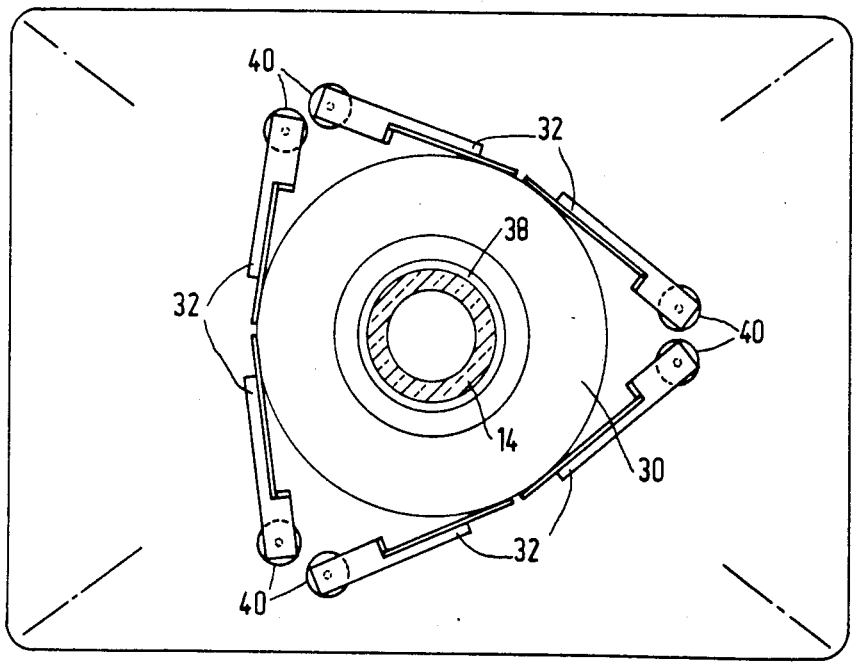
FIG. 6 is a view similar to FIG. 3 illustrating a deflection mounting arrangement comprising six connecting members.
Figure 7:
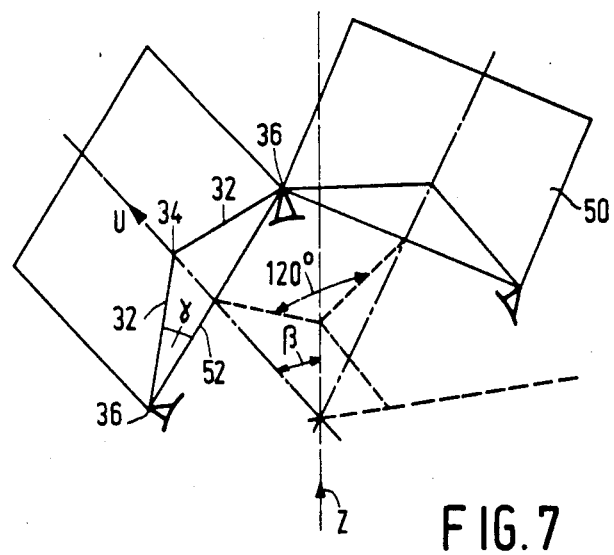
FIGS. 7 to 10 are diagrams to facilitate an understanding of how the points on the envelope to which the connecting members are secured are determined.
Figure 8:
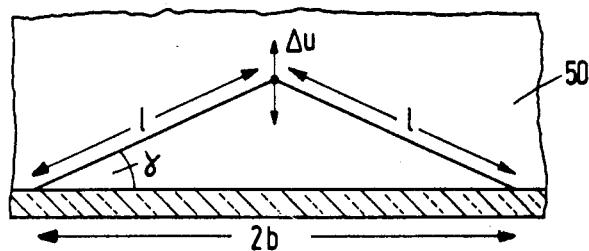

In another embodiment of the present invention shown in FIG. 6, there are six connecting members 32 arranged to simulate the three V-shaped devices 33 shown in FIGS. 1 to 5, that is, the members are arranged in pairs which diverge with respect to each other from respective adjacent points of attachment onto the deflection unit 30. The terminal portion of each member 32 is, after adjustment of the deflection unit 30, laser welded to its respective metal disc 40.

In both embodiments the connecting members 32 can be fabricated from thin sheet material because as a result of the statically determined support of the deflection unit 30 they are always loaded on a tensile pressure load. Thus it is possible to have the minimum of material for the maximum of rigidity. In selecting a profile for the members, a factor which should be borne in mind is that they should be resistant to buckling.

Other materials or combinations of materials may be used for fabricating the connecting members 32 subject to their complying with the requirement of thermal expansion and stability and rigidity. For example the members 32 may be of glass which is bonded directly to the glass of the conical portion with ultra-violet sensitive glues. In another example the members 32 may be of synthetic materials optionally including reinforcing fibres which are ultrasonically welded to plastics discs previously bonded to the conical portion of the envelope.

The minimum number of points of attachment of the connecting members to the conical portion is three but a larger number of points, for example 4, 5 or 6, may be used and still enable mounting in six degrees of freedom.

What is claimed is:

1. A method of mounting a deflection unit on a cathode ray tube envelope, comprising disposing a deflection unit on the envelope, the deflection unit having at least six connecting members, pairs of the connecting members having corresponding ends connected at spaced apart positions to the deflection unit, each connection point being contiguous with a connection point of an end of an adjacent member of another pair, the members of each pair being mutually convergent so that their terminal portions are contiguous; displaying a test pattern on the cathode ray tube; adjusting the deflection unit such that an optimum pattern is obtained and that the terminal portions of the connecting members are contacting substantially tangentially the surface of a conical portion of the envelope; and effecting a rapid, permanent connection of the terminal portions to the envelope.

2. A method as claimed in claim 1, wherein the conical portion is of glass and the terminal portions are metallic and, metal mounting pads are thermally compression bonded at predetermined positions on the conical portion, and the deflection unit is adjusted so that the contiguous terminal portions of the pairs of connecting members contact their respective mounting pad and are laser welded thereto at the completion of the adjustment of the deflection unit.

3. A display device comprising a cathode ray tube having an envelope formed of an optically transparent faceplate, a neck and a conical portion interconnecting the faceplate and the neck, a deflection unit disposed about the neck-conical portion transition of the envelope, and at least six elongate connecting members connecting the deflection unit to at least three points of attachment on the conical portion, pairs of the connecting members having corresponding ends connected at spaced apart positions on the deflection unit, each connection point being contiguous with a connection point of an end of an adjacent member of another pair, the members of each pair being mutually convergent so that their terminal portions are attached substantially contiguously to the conical portion, the pairs being inclined with respect to a longitudinal axis of the cathode ray tube, the inclination of each of the pairs being such that each pair is substantially tangential to the conical portion at its point of attachment therewith so that substantially shear stress is applied to the point of attachment.

4. A display device as claimed in claim 3, wherein pairs of the connecting members comprise respective limbs of V-shaped devices which are attached by their vertices to the conical portion, and wherein adjacent connecting members from different pairs are attached substantially contiguously to the deflection unit.

5. A display device as claimed in claim 3, wherein at least terminal portions of the connecting members attached to the conical portion are metallic and the connection of said terminal portions to the conical portion is by way of laser welds.

6. A display device as claimed in claim 5, wherein metallic mounting pads are thermally compression bonded to the conical portion at predetermined positions thereon and the terminal portions are attached by laser welds to the mounting pads.

7. A display device as claimed in claim 3, wherein at least terminal portions of the connecting members attached to the conical portion are of a synthetic material, and wherein the connections to the conical portion is by ultra-sonic welds to plastics mounting pads bonded at predetermined positions on the conical portion.

8. A display device as claimed in claim 6, wherein the material of the mounting pads has a coefficient of expansion substantially equal to that of the material of the conical portion.

9. A display device as claimed in claim 1, wherein the coefficient of expansion of the material of the connecting members matches substantially that of the material of the conical portion.

10. A display device as claimed in claim 1, wherein there are three points of attachment on the conical portion.

* * * * *